United States Patent Office
3,517,289
Patented June 23, 1970

3,517,289
SYSTEM FOR CONTROLLING THE SPEED AND RUNNING DIRECTION OF A BRUSHLESS DIRECT CURRENT MOTOR
Julius Brunner and Erich Rainer, Nuremberg, and Helmut Kaulfersch, Karlsruhe, Germany, assignors to Siemens Aktiengesellschaft, a German corporation
Filed Aug. 29, 1967, Ser. No. 664,139
Claims priority, application Germany, Sept. 14, 1966, S 105,852
Int. Cl. H02p 7/28
U.S. Cl. 318—138    1 Claim

ABSTRACT OF THE DISCLOSURE

A system for controlling the speed and running direction of a motor in dependence upon the magnitude and polarity of a variable direct voltage, particularly a reversible error voltage furnished from a self-compensating measuring or recording apparatus in which the motor being controlled is used for changing the apparatus to a setting that is indicative of the quantity being measured and at which the error voltage is equal to zero. Employed is a direct-current motor whose commutation is effected by means of two Hall generators subjected to the magnetic field of the rotor, the two Hall voltage electrodes of each Hall generator being connected to the respective bases of two transistors which control the energizing currents supplied through the stator windings of the motor. The control-current terminals of the Hall generators are connected to the circuit that supplies the variable control or error voltage so that the Hall voltage appearing at the Hall electrodes and applied to the bases of the transistors is proportional to the variable error voltage. The intensity of the torque-controlling current flowing through the stator windings in such a system is proportional to the Hall voltages of the Hall-generators and thus proportional to the controlling error voltage as to magnitude and polarity.

---

Figure 1:
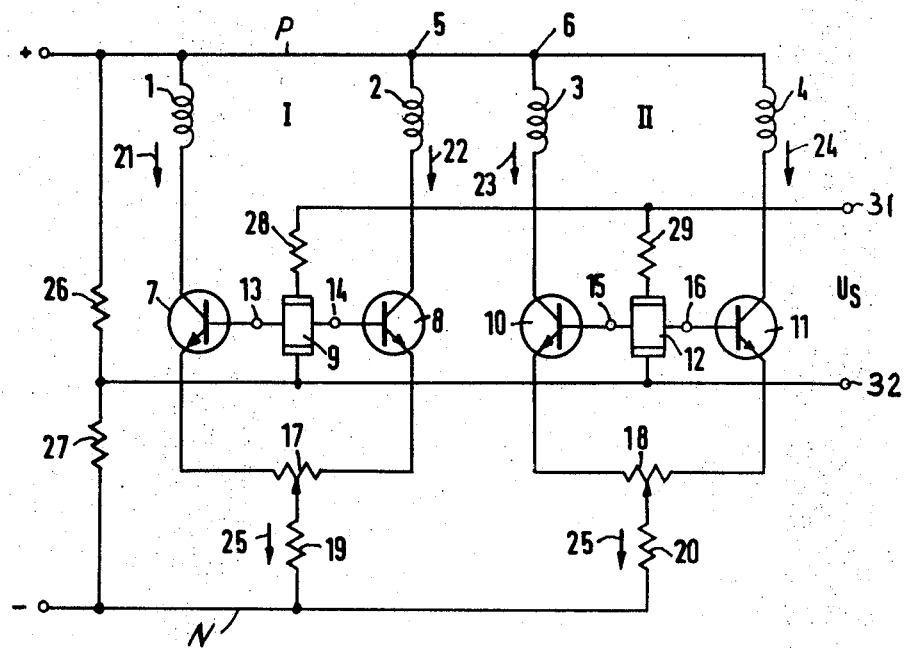

My invention relates to a system for controlling the speed and running direction of a motor in dependence upon the magnitude and polarity of a variable control voltage. In a more particular though not exclusive aspect the invention relates to a system of controlling a brushless direct-current motor for use with such equipment as self-compensating measuring or recording instrumentalities, also called compensographs, in which the motor serves to change the setting of a potentiometer or other circuit component in a direction and by an amount required for zeroing the error voltage issuing from the instrumentality and used for controlling the motor.

For the purpose of the invention we employ in the motor control system a brushless direct-current motor in which the current flowing through the stator windings is controlled in dependence upon the rotational position of the permanent-magnetic rotor with the aid of transistors so that the rotor is continuously subjected to a torque in one or the other direction, the transistors being in turn controlled by Hall-generators acted upon by the magnetic field of the rotor. Suitable direct-current motors and appertaining commutation control circuits are described in the copending application of Brunner and Rainer Ser. No. 634,212 filed Apr. 27, 1967 for Brushless Direct-Current Motor with Hall-Generator Control, and are also known from the paper by W. Dittrich and E. Rainer published in "Siemens Review," vol. 34, No. 3 (March 1967), p. 97–99.

As a rule, self-compensating compensographs are presently equipped with induction motors operating at utility line frequencies (50 or 60 Hz.) and having a rotating-field strength proportional to the compensating error of the compensograph. The rotating field is derived from a direct voltage proportional to the compensating error to be eliminated by the operation of the motor. This direct voltage is made pulsating with the aid of a chopper operating in synchronism with the line frequency and feeding into an amplifier. Due to operation at utility line frequency, spurious voltages stemming from the line may cause inaccuracies and measuring errors. These could be minimized by using induction motors for higher frequencies, for example 400 Hz., but motors of the latter type are much more expensive. The use of direct-current motors with mechanical commutators and contact brushes involves difficulties and trouble, especially in processing industries, such as when operating in aggressive atmospheres.

It is an object of our invention to avoid such disadvantages.

To this end, and in accordance with our invention we employ a brushless direct-current motor with commutation control by means of Hall generators and provide the control system with such circuitry as to make the torque of the motor proportional to a direct voltage which in turn is substantially proportional to the variable control voltage, such as the compensating error voltage furnished from a compensograph or other measuring instrumentality. We further provide such a motor with a transistorized control circuit whose transistors are of the same (pnp or npn) type and are so connected that the intensity of the torque-forming current flowing through the stator windings is proportional to the respective Hall voltages. The variable control voltage, such as an error voltage proportional to the compensating error of a compensograph or other instrumentality being served by the motor, is impressed upon the Hall-generators to furnish the variable control current necessary for varying the Hall output voltages.

Such a motor control system constitutes a regulating loop system and offers the further advantage that a direct-voltage feedback may be connected between the phase-selective demodulator of the regulator system and the motor proper for dynamically optimizing the regulatory performance, such direct-voltage feedbacks being readily applicable in practice. Furthermore, no trouble due to contact brushes either in mechanical respects or due to sparking can occur.

Figure 2:
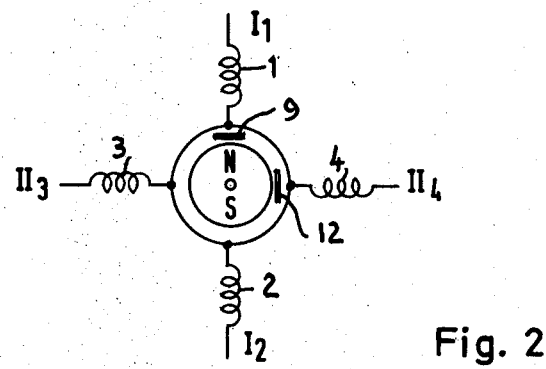

The invention will be further described with reference to an embodiment exemplified by the accompanying drawing in which:

FIG. 1 is a schematic circuit diagram of a motor control system according to the invention; and FIG. 2 is a schematic circuit diagram of the appertaining brushless direct-current motor.

The illustrated system is equipped with a brushless direct-current motor with two stator windings I and II angularly spaced 90° from each other. The winding I is composed of two coils 1 and 2 having the same number of turns. The stator winding II is equally divided into two coils III and IV. The midpoints 5 and 6 of the stator windings I and II are connected with the positive bus P which supplies the operating direct voltage. The rotor N–S of the motor is constituted by a diametrically polarized permanent magnet. Located in its field are two Hall generators 9 and 12 which are 90° angularly spaced from each other as is schematically shown in FIG. 2. Each of the Hall generators is constituted by a rectangular wafer of semiconductor material, for example indium antimonide, and carries current terminals at its two short sides and two Hall-voltage electrodes at its respective long sides midway between the current supply terminals. The Hall-electrode terminals of Hall generator 9 are denoted by 13 and 14. The corresponding electrode terminals of Hall generator 12 are denoted by 15 and 16.

Two transistors 7 and 8 have their respective bases connected to the Hall-electrode terminals 13 and 14 of Hall generator 9. The bases of two further transistors 10 and 11 are analogously connected to the electrode terminals 15 and 16 of Hall generator 12. The two ends of the stator winding I are connected to the collectors of respective transistors 7 and 8. The ends of stator winding II are connected to the collectors of respective transistors 10 and 11. The emitters of transistors 7 and 8 are interconnected by a voltage divider 17, and the emitters of transistors 10 and 11 are interconnected by another voltage divider 18. Each transistor has a displaceable tap connected through a resistor 19 or 20 with the negative supply bus N for the operating direct voltage.

The variable control voltage $U_s$ which may be constituted by the error voltage coming from a compensograph or the like instrumentality to be adjusted by the motor, is applied through terminals 31 and 32 to a control circuit 33. Resistors 28 and 29 are connected in this control circuit, each in series with the current supply terminals of one of the Hall generators 9 and 12. The component currents flowing through the stator coils 1, 2, 3 and 4 are schematically indicated by respective arrows 21, 22, 23 and 24. Arrows 25 denote the total current flowing through each of the two stator windings I and II. The terminal 32 of the control circuit 33 and consequently one current supply terminal of each of the Hall generators 9 and 12, is connected to the midpoint of a voltage divider constituted by resistors 26 and 27 which are series connected with each other between the positive and negative buses P and N.

For a given control voltage $U_s$ applied to the Hall generators 9 and 12 the following currents $J_1$ to $J_4$ flow through the four stator coils in departments upon the rotational angle $\alpha$ of the rotor:

$$J_1 - J_2 = V \cdot J \cdot U_s \cdot \sin \alpha$$
$$J_3 - J_4 = V \cdot J \cdot U_s \cdot \cos \alpha$$

In these equations the term V denotes the amplifying factor.

The magnetic rotor causes a magnetomotive force $\phi_I$ in the stator winding I and a corresponding magnetomotive force $\phi_{II}$ in stator winding II. These magnetomotive forces can be expressed as:

$$\phi_I = -\phi \cos \alpha$$
$$\phi_{II} = \phi \sin \alpha$$

With these magnetomotive forces there will result a torque M as follows:

$$M = (J_1 - J_2) \frac{d\phi_I}{d\alpha} \cdot w + (J_3 - J_4) \frac{d\phi_{II}}{d\alpha} \cdot w$$
$$= V J w \phi \cdot (\sin^2\alpha + \cos^2\alpha) \cdot U_s$$
$$= V J w \phi \cdot U_s$$

denoted by $w$ in these equations is the number of turns of one stator winding I or II. The latter equation indicates that the torque M is proportional to, and has the same directional sign as, the control voltage $U_s$.

To those skilled in the art it will be apparent from a study of this disclosure that our invention permits of modifications with respect to the design of the direct-current motor proper as well as relative to the appertaining circuitry and hence that our invention may be given embodiments other than particularly illustrated and described herein, without departing from the essential features of our invention as set forth in the claim annexed hereto.

We claim:

1. A system for controlling the speed and running direction of a motor in dependence upon the magnitude and polarity of a variable control or error voltage, comprising variable control voltage supply means, a brushless direct current motor having two stator windings angularly related to each other and having a rotor magnetic field, a commutation network having two Hall generators disposed in said field in angular relation to each other, each Hall generator having two control current terminals and two Hall voltage electrodes, said terminals being connected with said control voltage supply means for controlling said Hall generators by voltage proportional to the variable control voltage to be responded to by said motor, direct current supply buses for energizing said motor, each of said two stator windings having a midpoint connected to the positive one of said direct current supply buses, two transistors of the same type each having an emitter-collector path connected in series with each of said respective stator windings between said buses and having respective bases connected to said Hall voltage electrodes of one of said respective Hall generators, each of said stator windings having its ends connected to the respective collector electrodes of the appertaining two of said transistors, resistance means connecting the emitter electrodes of said two transistors with the negative one of said direct current supply buses, said resistance means comprising a voltage divider interconnecting the emitter electrodes of said two transistors and having a tap and a resistor connected between tap and said negative one of said direct current supply buses, and resistor means series connected between each of said Hall generators and said variable control voltage supply means, whereby the torque of said motor is substantially proportional to, and directionally dependent upon, the variable control voltage.

References Cited

UNITED STATES PATENTS

| | | |
|---|---|---|
| 3,159,777 | 12/1964 | Manteuffel. |
| 3,165,685 | 1/1965 | Manteuffel et al. |
| 3,170,323 | 2/1965 | Kuhrt et al. |
| 3,194,990 | 7/1965 | Kendall. |
| 3,210,631 | 10/1965 | Niccolls _____ 318—254 XR |
| 3,368,127 | 2/1968 | Grancoin _____ 318—254 XR |
| 3,383,574 | 5/1968 | Manteuffel _____ 318—254 XR |

G. R. SIMMONS, Primary Examiner

U.S. Cl. X.R.

318—254